(12) United States Patent
Gross et al.

(10) Patent No.: US 10,860,938 B2
(45) Date of Patent: Dec. 8, 2020

(54) USING THE BARYCENTRIC COORDINATE TECHNIQUE TO DETERMINE OPTIMAL SENSOR LOCATIONS

(71) Applicant: Oracle International Corporation, Redwood Shores, CA (US)

(72) Inventors: Kenny C. Gross, Escondido, CA (US); Aleksey M. Urmanov, San Diego, CA (US)

(73) Assignee: Oracle International Corporation, Redwood Shores, CA (US)

(*) Notice: Subject to any disclaimer, the term of this patent is extended or adjusted under 35 U.S.C. 154(b) by 504 days.

(21) Appl. No.: 15/951,996

(22) Filed: Apr. 12, 2018

(65) Prior Publication Data

US 2019/0318251 A1    Oct. 17, 2019

(51) Int. Cl.
*G01C 9/00* (2006.01)
*G06N 5/04* (2006.01)
*G01M 99/00* (2011.01)
*G06N 20/00* (2019.01)

(52) U.S. Cl.
CPC .............. *G06N 5/04* (2013.01); *G01M 99/00* (2013.01); *G06N 20/00* (2019.01)

(58) Field of Classification Search
CPC .......... G06N 5/04; G06N 20/00; G01M 99/00

USPC ......................................................... 702/150
See application file for complete search history.

(56) References Cited

U.S. PATENT DOCUMENTS

| 7,573,952 B1* | 8/2009 | Thampy | G06F 17/18 375/316 |
| 2011/0037732 A1* | 2/2011 | Takama | G06F 3/042 345/175 |

* cited by examiner

*Primary Examiner* — Aditya S Bhat
(74) *Attorney, Agent, or Firm* — Park, Vaughan, Fleming & Dowler LLP

(57) ABSTRACT

After sensors are placed at three or more non-collinear locations on a surface of the component, the system receives time-series signals from the sensors while the component operates on a representative workload. The system then defines one or more triangles on the surface of the component, wherein each triangle is defined by three vertices, which coincide with different sensor locations on the surface of the component. For each triangle, the system applies a barycentric coordinate technique (BCT) to time-series signals received from sensors located at the vertices of the triangle to determine a candidate location within the triangle to place an additional sensor. The system then compares the candidate locations for each of the one or more triangles to determine a globally optimal location for the additional sensor, and a new sensor is placed at this location. This process is repeated until a desired number of sensors are placed.

20 Claims, 9 Drawing Sheets

$C_{11}$ $C_{12}$ $C_{13}$ ...

$C_{21}$ $C_{22}$ ...

⋮

⋮ ⋮

$C_{51}$ ... ... $C_{56}$ $$\begin{pmatrix} x_1 & x_2 & x_3 \\ y_1 & y_2 & y_2 \\ 1 & 1 & 1 \end{pmatrix} \vec{C}_3 = \begin{pmatrix} x_0 \\ y_0 \\ 1 \end{pmatrix}$$

USED TO COMPUTE
EXAMPLE IN FIG. 4 $\longrightarrow$ $\vec{C}_3 = \begin{pmatrix} 0.1 \\ 0.1 \\ 0.8 \end{pmatrix}$

FIG. 5

$$\vec{C}_3 = \begin{pmatrix} c_1 \\ c_2 \\ c_3 \end{pmatrix}$$

$c_1 = 0.0, \ 0.1, \ 0.2, \ \ldots\ldots\ 0.9$ $c_2 = 0.0, \ 0.1, \ 0.2, \ \ldots\ldots\ 0.9$ $c_3 = 0.0, \ 0.1, \ 0.2, \ \ldots\ldots\ 0.9$

FIG. 6

$$\vec{C}_4 = \begin{pmatrix} c_1 \\ c_2 \\ c_3 \\ c_4 \end{pmatrix}$$

$c_1 = 0.0, 0.1, 0.2, \ldots\ldots 0.9$ $c_2 = 0.0, 0.1, 0.2, \ldots\ldots 0.9$ $c_3 = 0.0, 0.1, 0.2, \ldots\ldots 0.9$ $c_4 = 0.0, 0.1, 0.2, \ldots\ldots 0.9$

FIG. 9

USING THE BARYCENTRIC COORDINATE TECHNIQUE TO DETERMINE OPTIMAL SENSOR LOCATIONS

BACKGROUND

Field

The disclosed embodiments generally relate to systems that use telemetry data from sensors to proactively detect impending problems in critical system assets. More specifically, the disclosed embodiments provide a system that uses the barycentric coordinate technique (BCT) to determine optimal sensor locations in critical system assets to collect telemetry data for prognostic-surveillance purposes.

Related Art

In recent decades, critical assets in various industries, such as utilities, manufacturing, oil and gas, transportation, and enterprise computing, were typically equipped with a minimal set of sensors that would trigger an alarm if measured variables exceeded specific thresholds. For example if a high-temperature threshold is exceeded, an asset can automatically shut down before an internal component catches fire. In another example, if the vibration level for a machine exceeds a specific threshold, the machine can be shut down before a catastrophic failure. In yet another example, if a voltage level droops too low (e.g., due to a power supply problem), a circuit board can be shut down before the lower voltage causes failures of electronic components. These scenarios are examples of "reactive maintenance;" they are "reactive" because by the time a sensor signal triggers a threshold, the degradation event may already be significantly underway, or the asset can fail before an alarm is generated.

To address the shortcomings of these reactive maintenance techniques, researchers have developed prognostic-surveillance techniques to detect the incipience or onset of degradation mechanisms before problems occur. This makes it possible to perform "proactive maintenance" to address impending problems before they arise. These prognostic-surveillance techniques operate by: continuously analyzing telemetry signals; learning patterns in the telemetry signals when all systems and components are behaving normally; and then detecting anomalous patterns that signify the incipience or onset of degradation mechanisms. (For example, see U.S. Pat. No. 7,181,651, entitled "Detecting and Correcting a Failure Sequence in a Computer System Before a Failure Occurs, by inventors Kenny C. Gross, et al., filed on Feb. 2, 2004, which is incorporated by reference herein.)

Although these proactive monitoring techniques can provide significant benefits based on the existing sparse sensors that are available in such critical assets, the derived benefit can be significantly higher when additional sensors are added to the critical assets. For industries where the addition of sensors to existing legacy assets is difficult or cost prohibitive, the next release for those assets can achieve the same higher prognostic benefits by the addition of more sensors when the assets are at the prototype stage. At the same time, the cost of such sensors and associated computing power has dropped dramatically in recent years.

Although significant benefits can be derived from incorporating additional sensors into critical assets, it is not obvious where to locate the new sensors. The conventional practice for locating sensors is fairly crude: during the prototype design phase, a system designer selects locations for new sensors that are "most convenient." To system designers, this means selecting locations from which it is easy to run circuitry to an analog-to-digital chip and an associated data-acquisition-module, and locations that are not too densely congested with other components. Note that thermal engineers have specific preferences for locating thermal sensors, for example to avoid selecting locations on "insulation" material, and to select locations where thermal conductance is higher and thermal attenuation is lower. Therefore, the conventional practice for placing sensors can lead to locations that are sub-optimal for prognostic-surveillance purposes.

Hence, what is needed is a technique for locating sensors in critical assets, which facilitates subsequent prognostic-monitoring operations performed on the sensor data.

SUMMARY

The disclosed embodiments relate to a system that determines sensor locations for a component to be monitored. After sensors are placed at three or more non-collinear locations on a surface of the component, the system receives time-series signals from the sensors while the component operates on a representative workload. The system then defines one or more triangles on the surface of the component, wherein each triangle is defined by three vertices, which coincide with three different sensor locations on the surface of the component. Next, for each triangle, the system applies a barycentric coordinate technique (BCT) to time-series signals received from sensors located at the vertices of the triangle to determine a candidate location within the triangle to place an additional sensor. The system then compares the candidate locations for each of the one or more triangles to determine a globally optimal location for the additional sensor. Finally, the system indicates that the additional sensor needs to be placed at the globally optimal location.

In some embodiments, after the additional sensor is placed, the system repeats the process to determine a location for another additional sensor.

In some embodiments, the system repeats the process until the location of the additional sensor moves less than a predefined distance from the location of a preceding additional sensor.

In some embodiments, the sensors are initially placed at extrema points on the surface of the component.

In some embodiments, while comparing the candidate locations for the one or more triangles, the system compares residuals produced by the MSET technique to determine how well time-series signals originating from other sensors will predict a signal originating from an additional sensor at each of the candidate locations.

In some embodiments, the component comprises: an electronic device; a mechanical device; an electro-mechanical device, or a hydraulic flow system or subsystem.

In some embodiments, the optimal location for the new sensor maximizes one or more of the following for a time-series signal received from the additional sensor: information content; sensitivity to changes in operational parameters of the component; and correlation with time-series signals from other sensors.

In some embodiments, after one or more additional sensors are placed on the component, the system switches to an operational mode, wherein the system: receives time-series signals from the sensors while the component operates on a real workload; and analyzes the time-series signals using a prognostic-surveillance system to detect incipient anomalies that arise during execution of the component.

In some embodiments, while analyzing the time-series signals, the system: uses an inferential model trained on previously received time-series signals from the component to generate estimated values for the time-series signals based on correlations between the time-series signals; performs a pairwise differencing operation between actual values and the estimated values for the time-series signals to produce residuals; and performs a sequential probability ratio test (SPRT) on the residuals to detect incipient anomalies that arise during operation of the monitored system.

In some embodiments, the inferential model is trained using the Multivariate State Estimation Technique (MSET).

In some embodiments, after the one or more additional sensors are placed, the system uses the BCT to refine locations for one or more of the initially placed sensors.

BRIEF DESCRIPTION OF THE FIGURES

FIG. 5 illustrates equations for computing barycentric coordinate finite element interpolations across a triangular grid in accordance with the disclosed embodiments.

FIG. 6 illustrates the process of generating a grid of interpolates in accordance with the disclosed embodiments.

FIG. 9 illustrates equations involved in the tetrahedral simplex method for 3D sensor-placement optimization in accordance with the disclosed embodiments.

DETAILED DESCRIPTION

Figure 1:
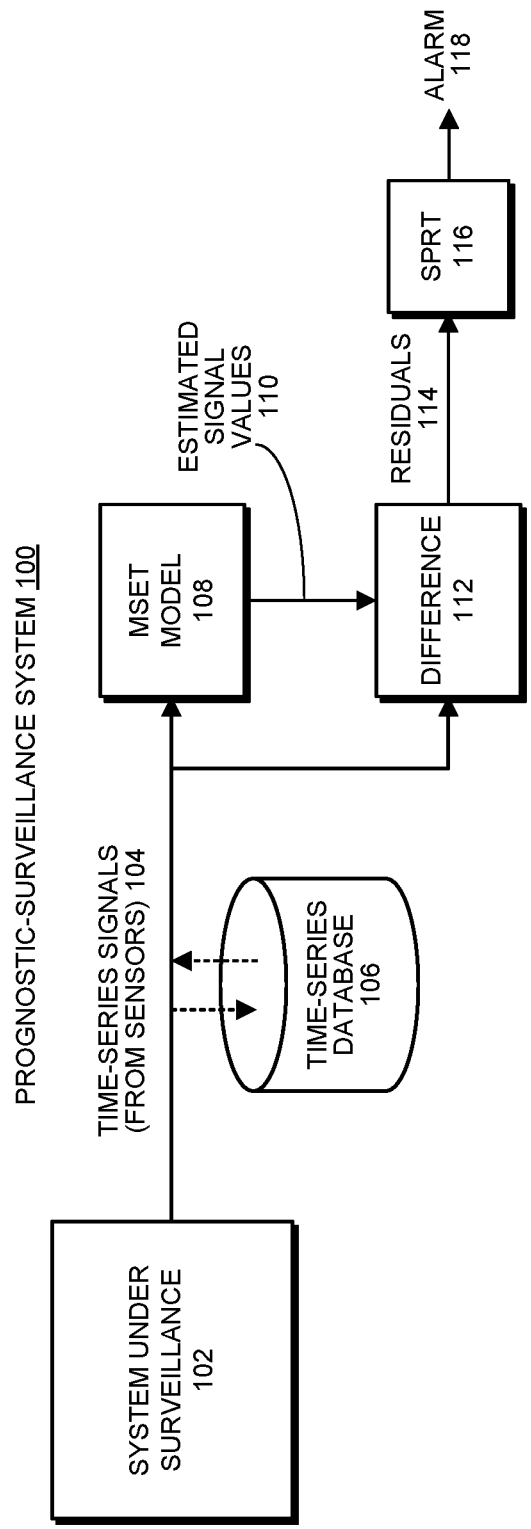
FIG. 1 illustrates an exemplary prognostic-surveillance system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

This disclosure presents a novel intelligent "sensor placement" technique for identifying the optimal locations inside or on the surface of critical assets to locate sensors for gathering time-series signals to facilitate prognostic surveillance. This iterative process, which is based in BCT, quickly and efficiently identifies the "best locations" for sensors from the standpoint of prognostic sensitivity, and maximal correlation with other physical variables inside an operating asset.

Note that for a large class of critical assets in the utility industry, subtle thermal anomalies are a leading indicator of the incipience or onset of degradation mechanisms. Moreover, the utility industry is presently going through a significant upgrade in sensor-related equipment as part of the new U.S. smart grid initiative. Additionally, this new technique for intelligent sensor placement has broad applicability beyond thermal sensors, to other types of physical transducers. For example, all types of single axis and triaxial accelerometers for sensing vibrations in critical assets will immediately benefit from this technique. In general, the disclosed technique can be applied to all types of sensors where the spatial location of the sensor can improve or worsen because of differences in attenuation, and differences in ambient interference for the variable the transducer is sensing.

Before describing this new sensor-placement technique further, we first describe a prognostic-surveillance system that analyzes time-series sensor data obtained from the sensors to detect incipient anomalies.

Exemplary Prognostic-Surveillance System

The above-described sensor-placement technique is used to facilitate downstream prognostic-surveillance operations involving the time-series signals from the sensors. For example, FIG. 1 illustrates an exemplary prognostic-surveillance system 100 that makes use of a time-series database 106 that contains such time-series signals obtained from sensors in accordance with the disclosed embodiments.

As illustrated in FIG. 1, system 100 operates on a set of time-series signals 104 obtained from sensors in an IoT system under surveillance 102. Note that IoT 102 can generally include any type of machinery or facility, which includes sensors and generates time-series signals. Moreover, time-series signals 104 can originate from any type of sensor, which can be located in a component in critical assets 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from critical assets 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics*. 16 (2): 117-186.) In this way, prognostic-surveillance system 100 can proactively alert system operators of incipient anomalies, such as impending failures, hopefully with enough lead time so that such problems can be avoided or proactively fixed.

Smart Grid Initiative

The United States is presently undergoing a transition to a continental smart grid. As part of the smart grid initiative, the United States Department of Energy (USDOE) recommends that all U.S. utilities develop (or subscribe to) an advanced distribution management system (ADMS). In the past, utilities have essentially practiced "reactive maintenance" for power distribution systems. When customers notify a utility that their power went off, the utility dispatches crews to repair the source of the outage (e.g., a failed transformer, a failed substation, or a line down).

Under the smart grid initiative, the USDOE wants utilities to develop or acquire new monitoring and proactive-maintenance practices, wherein critical assets in the power distribution grid are monitored continuously with machine-learning (ML) techniques to detect incipient degradation mechanisms or other indicators of age-related wear, and to proactively maintain the assets to enhance the overall up time for the grid.

The disclosed embodiments enable developers to more intelligently add sensors to critical components in the electrical distribution grid to facilitate prognostic monitoring of critical assets. Moreover, the disclosed embodiments are directed to placing thermal sensors, which are crucial for prognostic monitoring of electronic, mechanical, and electromechanical assets, and also to hydraulic flow systems, subsystems, piping, heat-exchangers, and valves. Note that thermal sensors are crucial to prognostic surveillance in the utility industry because a wide range of anomalies in utility assets appear first as an increase in local component temperatures. For example, increased temperatures can result from: increased resistance in internal electrical circuitry; over-current events (such as from a malfunctioning power supply unit); increased friction in rotating components in motors, generators, fans, blowers, which can be caused by factors such as "bearing out of roundness" and lubrication dry out; dust-fouling of internals; or internal cooling-flow anomalies.

Although the disclosed embodiments are directed to intelligent placement of thermal sensors, it will be obvious to one skilled in the art that this new technique can be applied to other types of sensors where the spatial location of the sensor is better or worse depending on differences in attenuation and differences in ambient interference for the variable the sensor is monitoring. (For example, single axis and triaxial accelerometers for sensing vibrations in critical assets will immediately benefit from this technique.)

A better procedure, which is hugely expensive and hence is seldom done, is to determine the optimal locations for new sensors through an iterative experimental procedure that progresses as follows. (1) First, engineers empirically determine optimal sensor placements by taking a prototype of the asset into a laboratory, dismantling the asset and installing high-accuracy sensors, which are connected to a high-sampling rate, high-resolution external data-acquisition module. (2) Next, the engineers reassemble the prototype. (3) The engineers then run dynamic experiments to put the asset through the normal thermal dynamics it will see in service. (4) The engineers subsequently disassemble the asset and move the sensors to new locations. (5) Steps (3) and (4) are repeated until all possible sensor locations are covered. (6) The system then performs pattern recognition analyses on datasets logged through iterative applications of steps (3) and (4) to determine which locations yield: the highest sensitivity to thermal dynamics; the best signal-to-noise ratios; and the lowest interference from ambient thermal dynamics. Note that the above-described technique can be used to determine optimal sensor placements for all types of electronic, mechanical, electromechanical, and hydraulic-flow systems, but is extremely time-consuming and costly.

The disclosed embodiments provide a new process for intelligent sensor placement, which significantly reduces the time and resources required to identify the optimal sensor locations. This new process provides a systematic, iterative procedure for optimally locating physical sensors inside mechanical, electronic, electromechanical, and hydrasulic-flow assets, while requiring a minimum amount of experimental work to quickly identify the optimal locations.

This new iterative process exploits two techniques: (1) the Triangular Simplex Method in 2D; and (2) the Tetrahedral Simplex Method in 3D, which are both part of a method called the "barycentric coordinate technique" (BCT), which was developed to find failed fuel elements in nuclear reactors. (Please see "Barycentric-Coordinates Technique for Identification of Simultaneous Nuclear Fuel Failures with Gas Tagging," K. C. Gross and C. Passerello, J. of Nuclear Science and Engineering 76, 75, 1, 1980.)

Although the above-described process is directed to optimally locating temperature sensors on the surface of a rectangular component, the technique works equally well for optimally locating a sensor on the surface of any geometrically shaped component. Moreover, the technique can be generalized to identify optimal locations for positioning temperature sensors (or other physical transducers) inside a three-dimensional (3D) structure.

Figures 2A, 2B:
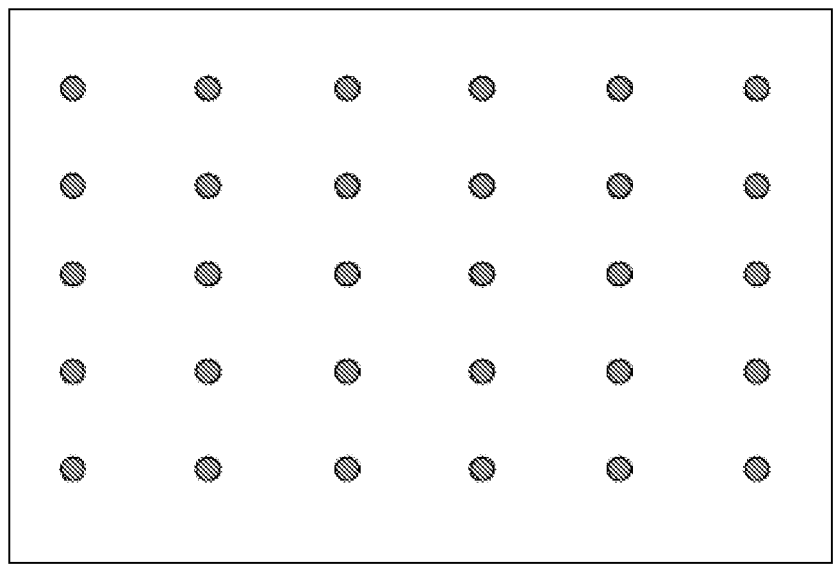
FIG. 2A illustrates a prior art technique for measuring temperatures at multiple locations.
FIG. 2B illustrates an array of time-series vectors in accordance with the disclosed embodiments.

Referring to FIG. 2A, suppose we have a rectangular surface and we would like to know the optimal position for affixing a thermal sensor on the surface. By "optimal," we mean the best location on the surface that will give the sensor the highest sensitivity to dynamic thermal variations, and hence the best correlation with other telemetry metrics.

As mentioned above, a "brute force" process for identifying the optimal location to position the thermal sensor would be to take measurements over the entire surface of the component, and then use pattern-recognition techniques to determine the best location. For example, to use such a "brute force" approach, we can measure temperature time-series signals at all of the 30 dots shown in FIG. 2A, while introducing typical performance dynamics into the system as the measurements are being made. In this way, we can determine which one of the 30 candidate locations illustrated in FIG. 2 is optimal.

Figure 3:
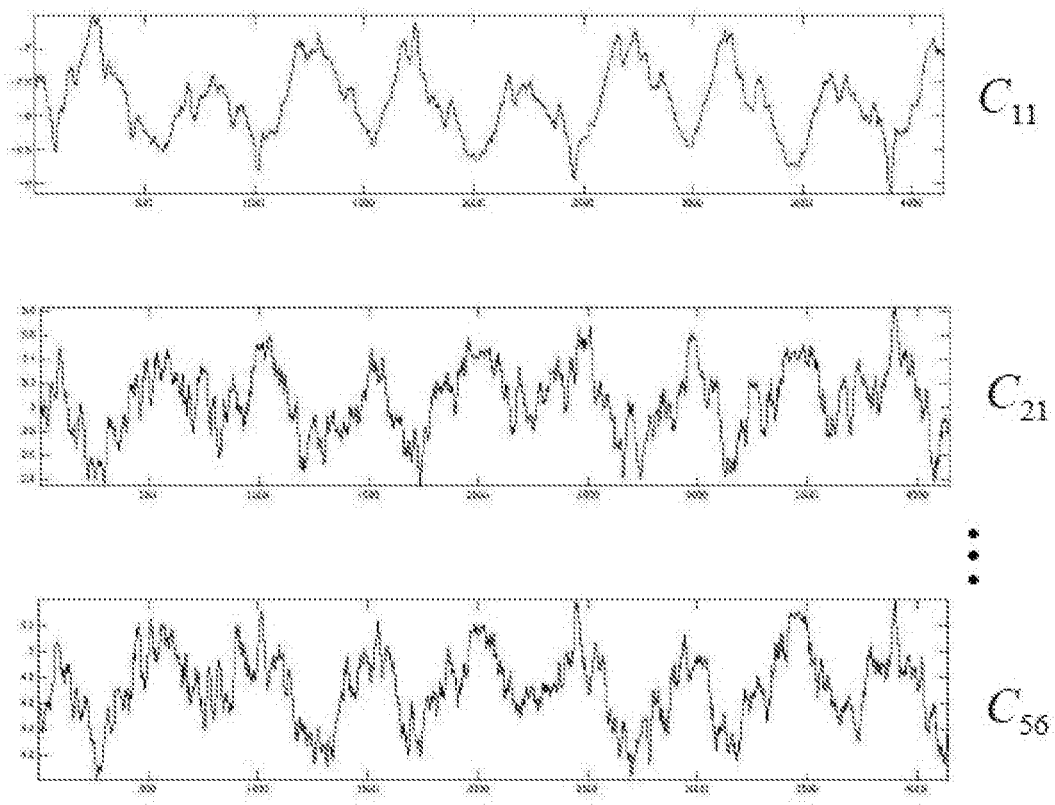
FIG. 3 illustrates signals associated with exemplary time-series vectors in accordance with the disclosed embodiments.

To accomplish this using the "brute force" process, we gather time-series signals from the 2D array of temperature sensors and input the time-series signals into an ML prognostic pattern-recognition system, which assess the degree of cross-correlation with other telemetry variables from the asset (e.g., load and performance metrics from other types of sensors, and other internal, upstream, or downstream temperature sensors). For example, see FIG. 2B for the array numbering scheme associated with the sensor locations illustrated in FIG. 1. Also see FIG. 3 for an example of several of the time-series signals gathered from the array. In some embodiments, we use MSET as the prognostic pattern-recognition technique. However, the new process will also work with other conventional ML prognostic pattern-recognition techniques, such as neural nets, support vector machines, or autoassociative kernel regression.

We input each of the 30 candidate temperature time-series signals shown in FIG. 2B into an MSET model to determine how well the other related telemetry signals can predict each candidate signal. (Note that we can use a quantitative metric, such as the root-mean sum of squares (RSS) of the residuals to measure the degree of "goodness" for each of the candidate time-series signals.) After applying this approach to all 30 time-series signals, the one yielding the lowest RSS error is determined to be the "best" with regards to exhibiting the strongest degree of correlation with the other related telemetry metrics from the asset. This "best signal" is associated with a "best location" for locating a thermal sensor.

However, this "brute force" technique requires 30 separate signal measurements, which results in a very time-consuming and tedious experimental procedure to find the optimal location for just one sensor. For an asset with more that 100 thermal sensors, this "brute force" technique will be even more time-consuming.

Figure 4:
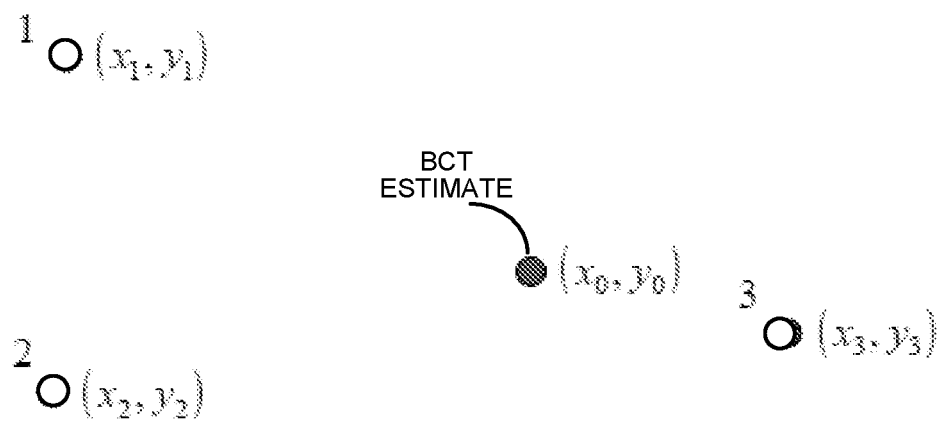
FIG. 4 illustrates the BCT for an optimal sensor location in accordance with the disclosed embodiments.
Figure 7:
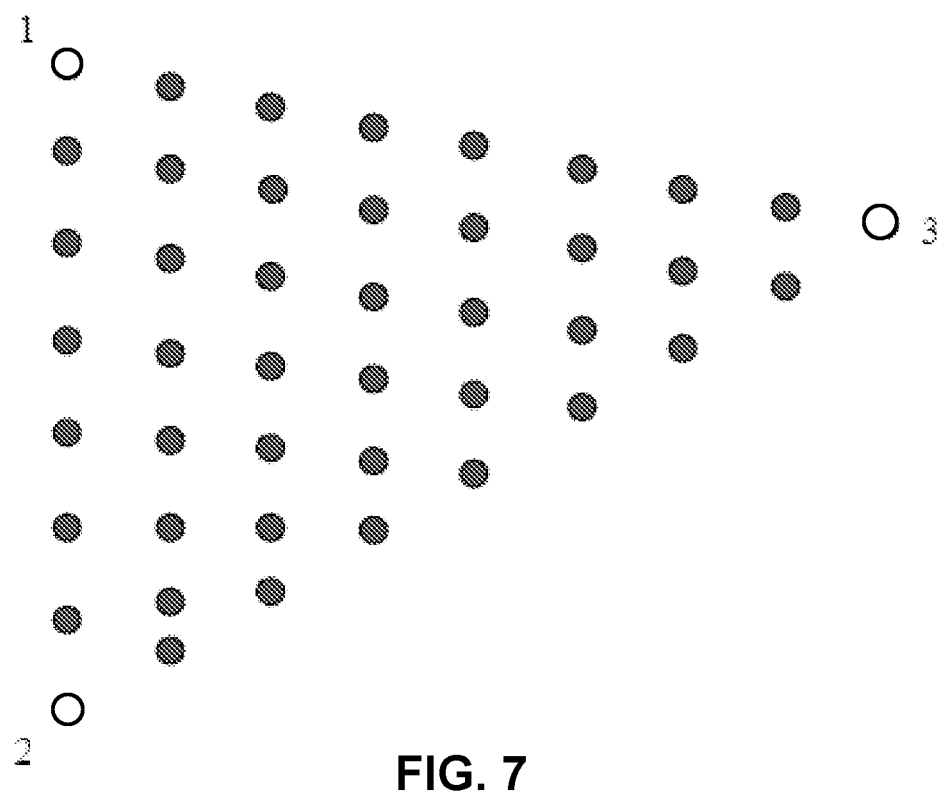
FIG. 7 illustrates BCT-generated time-series vectors in accordance with the disclosed embodiments.

Our new iterative technique requires substantially fewer experimental measurements to arrive at the same optimal position for a sensor. For example, referring to FIG. 4, we begin by selecting only three non-collinear locations (represented by the three white dots) and measuring the temperature time-series signals at those three locations. Next, we use the barycentric coordinate technique (BCT) to estimate the temperature at the location of the black dot. The BCT makes use of an efficient area interpolation technique, which is described by the simple equations shown in FIG. 5. Note that the fidelity of the interpolation depends upon an assumption of well-behaved linear gradients across the area being investigated. However, the degree to which this assumption is met affects only how rapidly the iterative process converges to the optimal sensor location. The equations shown in FIG. 6 generalize the coordinates in FIG. 5 by generating a grid of interpolates that spans the triangle formed by the measured locations. Referring to FIG. 7, note that results for all of the black dots are generated by the BCT equation using the grid shown in FIG. 6, while only requiring three experimental measurements taken from locations represented by the white dots.

We now use the pattern-recognition technique to identify the optimal location in FIG. 7 that provides the greatest degree of correlation with the other physical variables. However, when we identify the optimal location, we are not finished. We put a real transducer at this optimal location, and take measurements again. We then define a set of triangles using the three initial sensor locations along with the new sensor location as vertices for the set of triangles. Next, we use the BCT to identify candidate sensor locations within each triangle. We then compare the candidate sensor locations for each of the triangles to select a globally optimal location for the new sensor. This process is repeated until the optimal location moves by only a small amount between two successive iterations. Note that this new procedure involves substantially fewer measurements than the prior-art "brute force" approach.

Figure 8A:
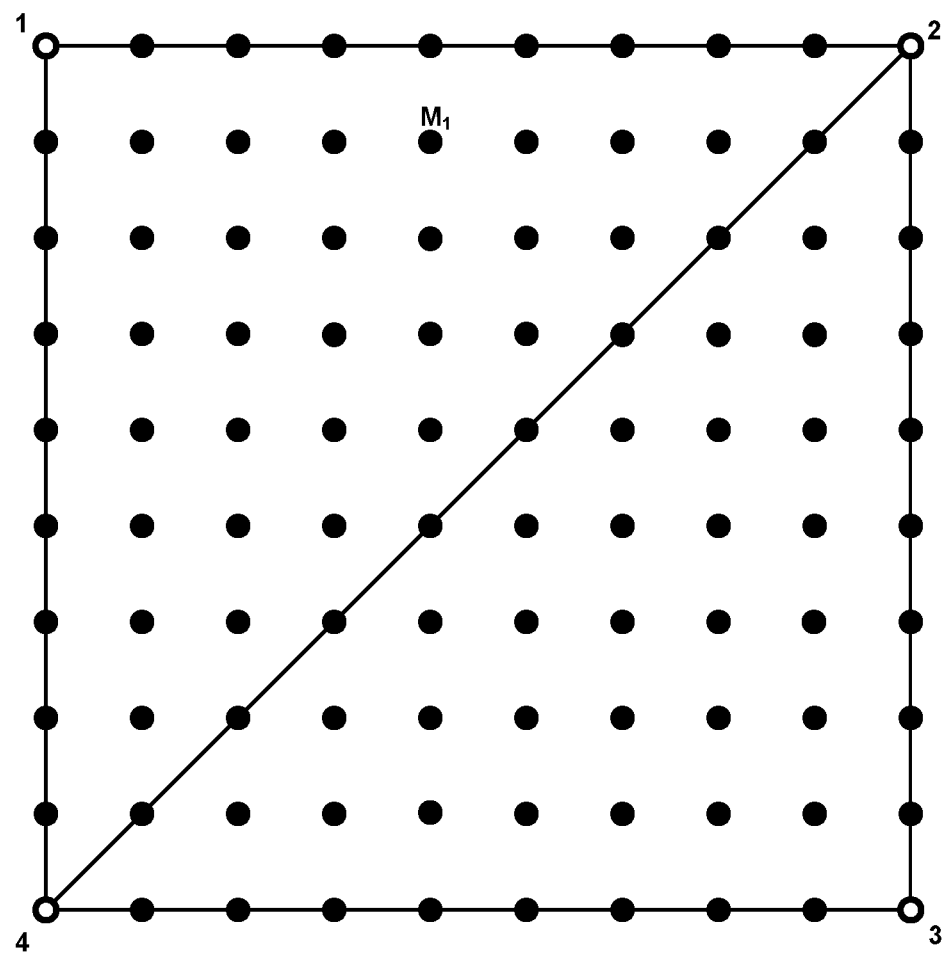
FIGS. 8A-8B illustrate steps of an exemplary process that uses the BCT to locate sensors in accordance with the disclosed embodiments.
Figure 8B:
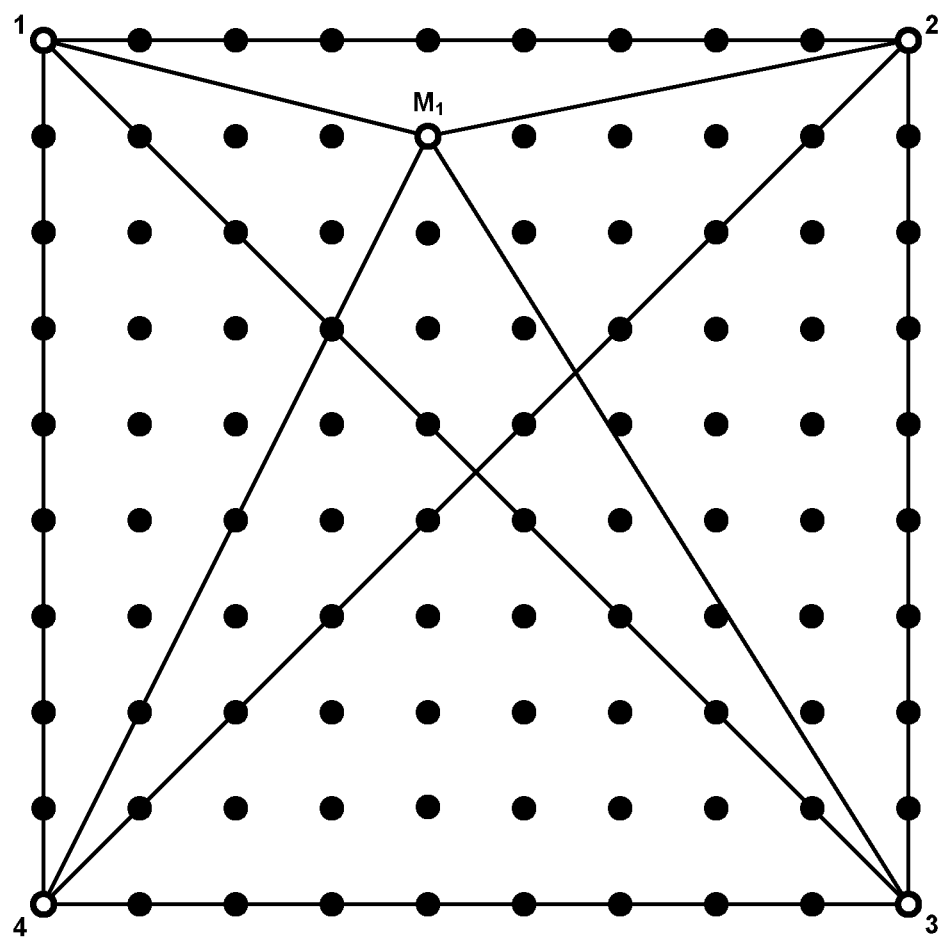

To provide additional details about this new technique, FIGS. 8A-8B illustrate steps of an exemplary process that uses BCT to locate sensors in accordance with the disclosed embodiments. More specifically, FIG. 8A illustrates a rectangular surface with 100 possible sensor locations indicated with white and black dots. At the start of the technique, temperature sensors are located at the white dots and time-series signals are gathered from the sensors while the asset is operating on a representative workload. Next, two triangles are defined, which have vertices that coincide with the white dots, namely triangles [1, 2, 4] and [2, 3, 4]. The system then uses the BCT to determine a candidate sensor location inside each of the triangles, and then compares the candidate locations to select a globally optimal location $M_1$ for a new sensor.

Referring to FIG. 8B, after a new sensor is located at $M_1$, time-series signals are gathered from the sensor locations 1, 2, 3, 4, and $M_1$, which are represented by white dots, while the asset is operating on a representative workload. Next, six triangles are defined, which have vertices that coincide with the white dots, namely triangles [1, 2, $M_1$], [1, 3, $M_1$], [1, 4, $M_1$], [2, 3, $M_1$], [2, 4, $M_1$] and [3, 4, $M_1$]. The system then uses the BCT to determine a candidate sensor location inside each of the triangles, and then compares the candidate locations to select a globally optimal location for a second new sensor. The above-described process is repeated until the location of the additional sensor moves less than a predefined distance from the location of a preceding additional sensor.

Generalization to Three Dimensions

Although a procedure has been described for identifying the optimal location on a 2D surface for positioning a new sensor, the technique can be extended into three dimensions by using a 3D version of the BCT called the Tetrahedral Simplex Method. Exemplary equations for the 3D simplex method are illustrated in FIG. 9.

Process of Determining Sensor Locations

Figure 10:
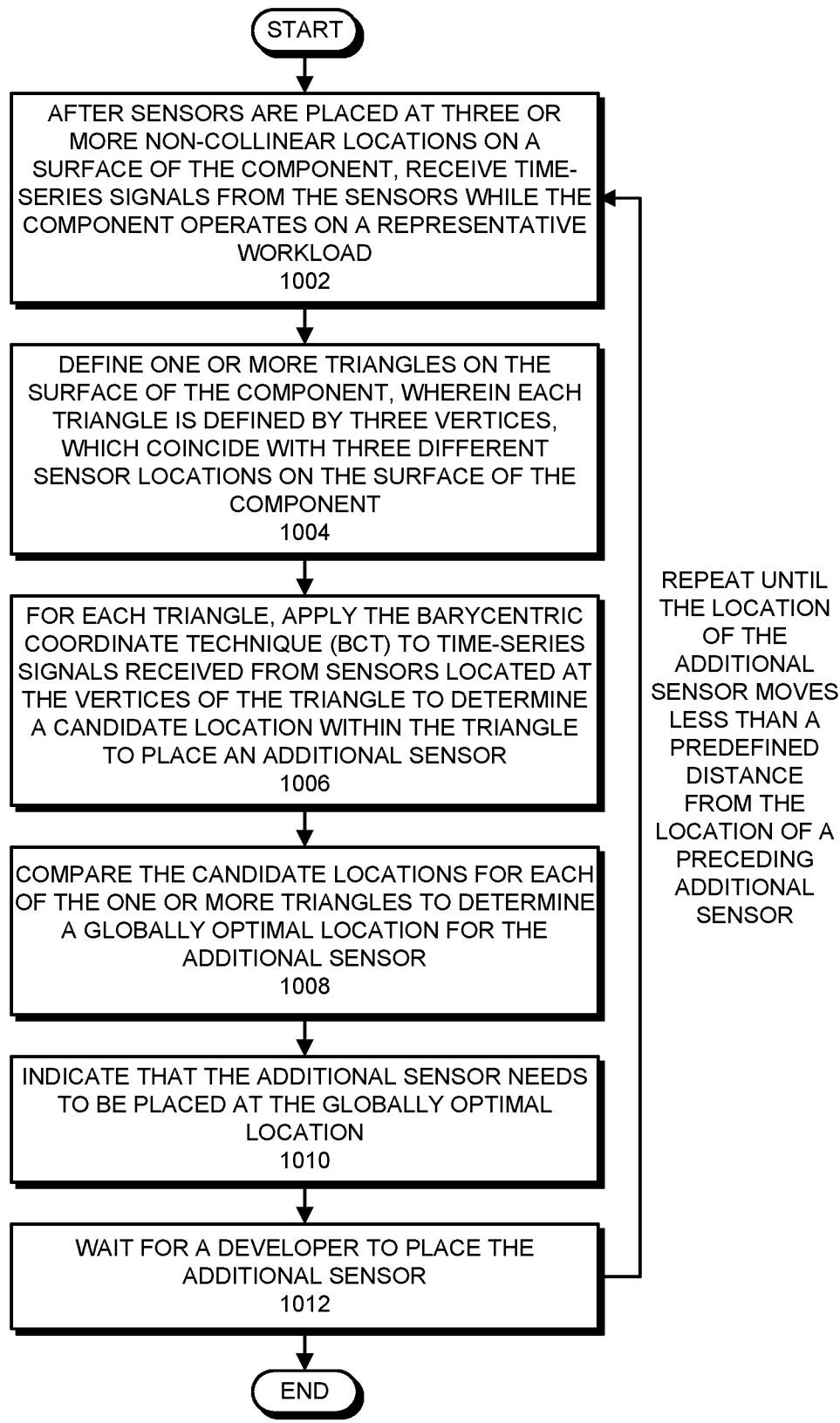
FIG. 10 presents a flow chart illustrating the process of determining sensor locations in accordance with the disclosed embodiments.

FIG. 10 presents a flow chart illustrating the process of determining sensor locations in accordance with the disclosed embodiments. First, after sensors are placed at three or more non-collinear locations on a surface of the component, the system receives time-series signals from the sensors while the component operates on a representative workload (step 1002). The system then defines one or more triangles on the surface of the component, wherein each triangle is defined by three vertices, which coincide with three different sensor locations on the surface of the component (step 1004). Next, for each triangle, the system applies a barycentric coordinate technique (BCT) to time-series signals received from sensors located at the vertices of the triangle to determine a candidate location within the triangle to place an additional sensor (step 1006). The system then compares the candidate locations for each of the one or more triangles to determine a globally optimal location for the additional sensor (step 1008). Next, the system indicates that the additional sensor needs to be placed at the globally optimal location (step 1010). The system then waits for a developer to place the additional sensor (step 1012.) The above-described process is repeated until the location of the additional sensor moves less than a predefined distance from the location of a preceding additional sensor.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for determining sensor locations for a component to be monitored, comprising:
    after sensors are placed at three or more non-collinear locations on a surface of the component, receiving time-series signals from the sensors while the component operates on a representative workload;
    defining one or more triangles on the surface of the component, wherein each triangle is defined by three vertices, which coincide with three different sensor locations on the surface of the component;
    for each triangle, applying a barycentric coordinate technique (BCT) to time-series signals received from sensors located at the vertices of the triangle to determine a candidate location within the triangle to place an additional sensor;
    comparing the candidate locations for each of the one or more triangles to determine a globally optimal location for the additional sensor; and
    indicating that the additional sensor needs to be placed at the globally optimal location.

2. The method of claim 1, wherein after the additional sensor is placed at the globally optimal location, the method is repeated to determine a location for another additional sensor.

3. The method of claim 2, wherein the method is repeated until the location of the additional sensor moves less than a predefined distance from the location of a preceding additional sensor.

4. The method of claim 1, wherein the sensors are initially placed at extrema points on the surface of the component.

5. The method of claim 1, wherein while comparing the candidate locations for the one or more triangles, the method compares residuals produced by the MSET technique to determine how well time-series signals originating from other sensors will predict a signal originating from an additional sensor at each of the candidate locations.

6. The method of claim 1, wherein the component comprises one of:
    an electronic device;
    a mechanical device,
    an electro-mechanical device; or
    a hydraulic-flow system.

7. The method of claim 1, wherein the optimal location for the new sensor maximizes one or more of the following for a time-series signal received from the additional sensor:
    information content;
    sensitivity to changes in operational parameters of the component; and
    correlation with time-series signals from other sensors.

8. The method of claim 1, wherein after the method completes and one or more additional sensors are placed on the component, the method further comprises:
    receiving time-series signals from the sensors while the component operates on a real workload; and
    analyzing the time-series signals using a prognostic-surveillance system to detect incipient anomalies that arise during execution of the component.

9. The method of claim 8, wherein analyzing the time-series signals using the prognostic-surveillance system comprises:
    using an inferential model trained on previously received time-series signals from the component to generate estimated values for the time-series signals based on correlations between the time-series signals;
    performing a pairwise differencing operation between actual values and the estimated values for the time-series signals to produce residuals; and
    performing a sequential probability ratio test (SPRT) on the residuals to detect incipient anomalies that arise during operation of the monitored system.

10. The method of claim 9, wherein the inferential model is trained using a Multivariate State Estimation Technique (MSET).

11. The method of claim 1, wherein after the one or more additional sensors are placed, the method further comprises using the BCT to refine locations for one or more of the initially placed sensors.

12. A non-transitory computer-readable storage medium storing instructions that when executed by a computer cause the computer to perform a method for determining sensor locations for a component to be monitored, the method comprising:
    after sensors are placed at three or more non-collinear locations on a surface of the component, receiving time-series signals from the sensors while the component operates on a representative workload;
    defining one or more triangles on the surface of the component, wherein each triangle is defined by three vertices, which coincide with three different sensor locations on the surface of the component;

for each triangle, applying a barycentric coordinate technique (BCT) to time-series signals received from sensors located at the vertices of the triangle to determine a candidate location within the triangle to place an additional sensor;

comparing the candidate locations for each of the one or more triangles to determine a globally optimal location for the additional sensor; and indicating that the additional sensor needs to be placed at the globally optimal location.

13. The non-transitory computer-readable storage medium of claim 12, wherein after the additional sensor is placed at the globally optimal location, the method is repeated to determine a location for another additional sensor.

14. The non-transitory computer-readable storage medium of claim 13, wherein the method is repeated until the location of the additional sensor moves less than a predefined distance from the location of a preceding additional sensor.

15. The non-transitory computer-readable storage medium of claim 12, wherein the sensors are initially placed at extrema points on the surface of the component.

16. The non-transitory computer-readable storage medium of claim 12, wherein while comparing the candidate locations for the one or more triangles, the method compares residuals produced by the MSET technique to determine how well time-series signals originating from other sensors will predict a signal originating from an additional sensor at each of the candidate locations.

17. The non-transitory computer-readable storage medium of claim 12, wherein the component comprises one of:
an electronic device;
a mechanical device;
an electro-mechanical device; or
a hydraulic-flow system.

18. The non-transitory computer-readable storage medium of claim 12, wherein after the method completes and one or more additional sensors are placed on the component, the method further comprises:

receiving time-series signals from the sensors while the component operates on a real workload; and analyzing the time-series signals using a prognostic-surveillance system to detect incipient anomalies that arise during execution of the component.

19. The non-transitory computer-readable storage medium of claim 18, wherein analyzing the time-series signals using the prognostic-surveillance system comprises:

using an inferential model trained on previously received time-series signals from the component to generate estimated values for the time-series signals based on correlations between the time-series signals;

performing a pairwise differencing operation between actual values and the estimated values for the time-series signals to produce residuals; and performing a sequential probability ratio test (SPRT) on the residuals to detect incipient anomalies that arise during operation of the monitored system.

20. A method for determining sensor locations for a component to be monitored, comprising:

after sensors are placed at four or more non-collinear locations in a volume within the component, receiving time-series signals from the sensors while the component operates on a representative workload;

defining one or more tetrahedra within the volume of the component, wherein each tetrahedron is defined by four vertices, which coincide with different sensor locations within the volume of the component;

for each tetrahedron, applying a three-dimensional barycentric coordinate technique (BCT) to time-series signals received from sensors located at the vertices of the tetrahedron to determine a candidate location within the tetrahedron to place an additional sensor;

comparing the candidate locations for each of the one or more tetrahedra to determine a globally optimal location for the additional sensor; and indicating that the additional sensor needs to be placed at the globally optimal location.

* * * * *

UNITED STATES PATENT AND TRADEMARK OFFICE
CERTIFICATE OF CORRECTION

PATENT NO. : 10,860,938 B2
APPLICATION NO. : 15/951996
DATED : December 8, 2020
INVENTOR(S) : Gross et al.

Page 1 of 1

It is certified that error appears in the above-identified patent and that said Letters Patent is hereby corrected as shown below:

In the Specification

In Column 6, Line 53, delete "hydrasulic-" and insert -- hydraulic- --, therefor.

In Column 7, Line 42, delete "that" and insert -- than --, therefor.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*